US008228826B2

(12) United States Patent
Boerger et al.

(10) Patent No.: US 8,228,826 B2
(45) Date of Patent: Jul. 24, 2012

(54) METHOD AND SYSTEM FOR CALL SETUP IN AN ASYNCHRONOUS FREQUENCY HOPPING DIGITAL TWO-WAY COMMUNICATION SYSTEM

(75) Inventors: Mark A. Boerger, Plantation, FL (US); Duminda A. Dewasurendra, Plantation, FL (US); Mahes M. Ekanayake, Davie, FL (US); John K. McKinney, Miramar, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 310 days.

(21) Appl. No.: 12/627,502

(22) Filed: Nov. 30, 2009

(65) Prior Publication Data

US 2011/0128894 A1 Jun. 2, 2011

(51) Int. Cl.
*H04B 1/56* (2006.01)
*H04L 5/14* (2006.01)
*H04B 7/00* (2006.01)
*H04B 15/00* (2006.01)
*H04J 3/06* (2006.01)
*H04W 4/00* (2009.01)
*H04W 72/00* (2009.01)

(52) U.S. Cl. ..... 370/276; 370/310; 370/503; 455/422.1; 455/450; 455/502

(58) Field of Classification Search ..................... None
See application file for complete search history.

(56) References Cited

U.S. PATENT DOCUMENTS

| 5,125,102 | A | 6/1992 | Childress et al. |
| 5,430,759 | A | 7/1995 | Yokev et al. |
| 5,930,685 | A | 7/1999 | Straub |
| 6,088,595 | A * | 7/2000 | Ciccone et al. ............... 455/463 |
| 6,236,649 | B1 * | 5/2001 | Jun ............................... 370/343 |
| 7,193,989 | B2 | 3/2007 | Melpignano |
| 7,218,682 | B2 * | 5/2007 | Mayor et al. .................. 375/299 |
| 2003/0223409 | A1 * | 12/2003 | Wiebe ........................... 370/352 |
| 2006/0019698 | A1 | 1/2006 | Ahya et al. |
| 2006/0104333 | A1 * | 5/2006 | Rainbolt et al. ............... 375/132 |
| 2008/0287146 | A1 | 11/2008 | Liu et al. |

* cited by examiner

*Primary Examiner* — Xavier Szewai Wong
(74) *Attorney, Agent, or Firm* — Randi L. Karpinia; Daniel R. Bestor

(57) ABSTRACT

A method for call setup in an asynchronous frequency hopping digital two-way communication system includes transmitting in adjacent time slots, by a caller device, a preamble slot over a first unique fixed frequency selected from a frequency hopset and a synchronization slot over a second unique fixed frequency selected from the frequency hopset. Further, the method includes one or more target devices transmitting an acknowledgement signal upon receiving the preamble slot over the first unique fixed frequency and the synchronization slot over the second unique fixed frequency, and followed by the caller device establishing the data communication link between the caller device and the one or more target devices over at least one random frequency selected from the frequency hopset, in response to receiving the acknowledgement signal from the one or more target devices.

20 Claims, 6 Drawing Sheets

METHOD AND SYSTEM FOR CALL SETUP IN AN ASYNCHRONOUS FREQUENCY HOPPING DIGITAL TWO-WAY COMMUNICATION SYSTEM

FIELD OF THE DISCLOSURE

The present disclosure relates generally to wireless communication systems and more particularly to a method and system for call setup in an asynchronous frequency hopping digital two-way communication system.

BACKGROUND

In half-duplex mobile-to-mobile communication systems (without network infrastructure), a mobile device has the ability to transmit and the ability to receive, but can perform only one of these functions at a time. Such systems can use an asynchronous frequency hopping method for communicating information between the devices, and need to synchronize the devices at the beginning of each data communication link setup. As a result, such systems suffer from time delay in establishing the data communication link, thereby diminishing user experience. Typically, such systems need a communication establishment time greater than one second. Now with the advancement in mobile-to-mobile communication, enhanced user experience requires fast call establishment. Therefore, there exists a need to reduce call setup time in two-way communication systems, specifically in systems using Asynchronous Frequency Hopping.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
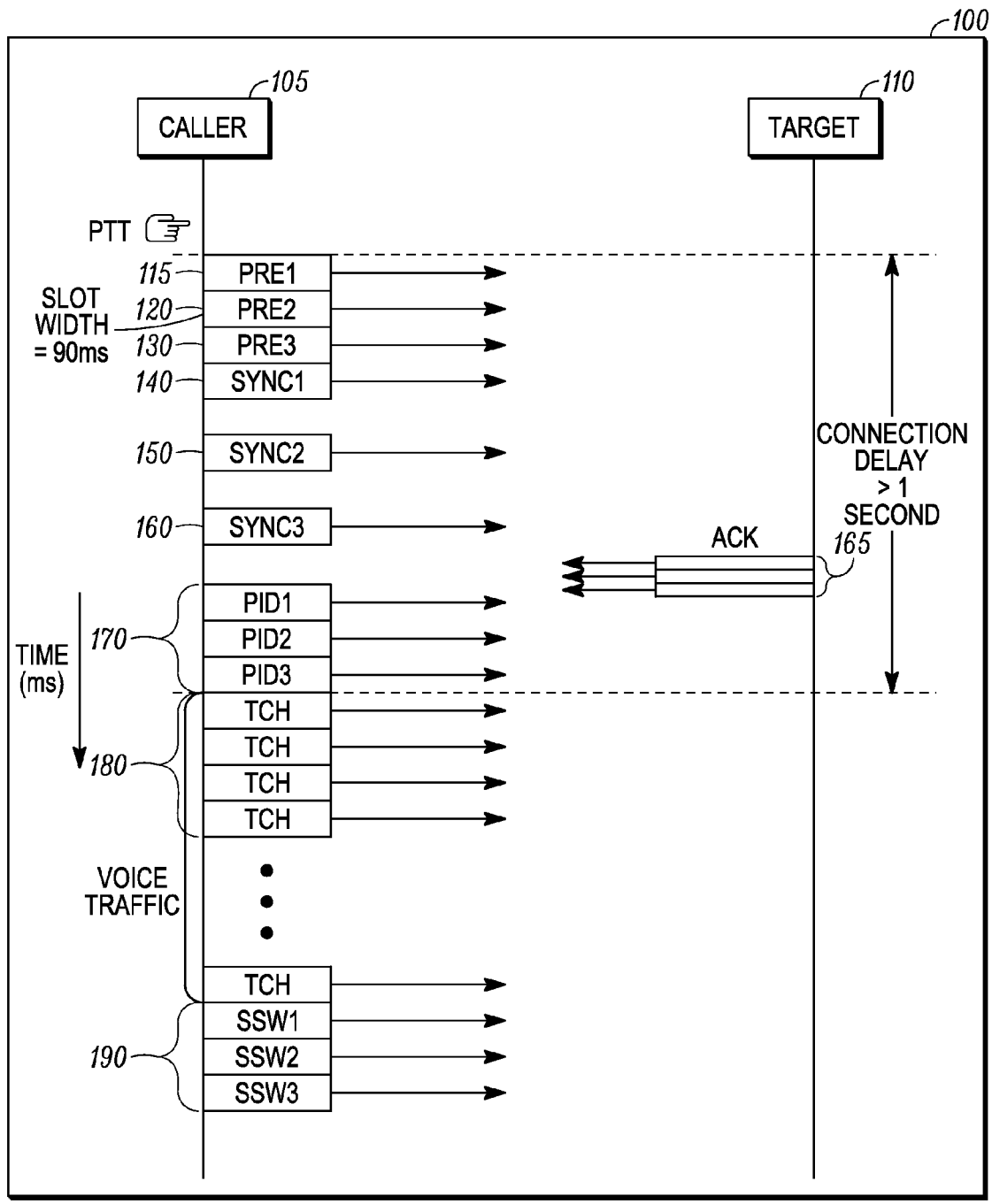
FIG. 1 illustrates a signal flow diagram of a communication method for setting up a call between a caller device and one or more target devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method for call setup in an asynchronous frequency hopping digital two-way communication system is provided herein. In operation, a caller device transmits, in adjacent time slots, a preamble slot over a first unique fixed frequency selected from a frequency hopset and a synchronization slot over a second unique fixed frequency selected from a frequency hopset. Further, one or more target devices receive the preamble slot over f1 and the synchronization slot over the f2 and transmits an acknowledgement signal over three frequencies randomly selected from the frequency hopset upon receiving the preamble slot and the synchronization slot. In response to receiving the acknowledgement signal from the one or more target devices, the caller device establishes the data communication link between the caller device and the one or more target devices over a plurality of frequencies randomly selected from the frequency hopset.

For example, FIG. 1 illustrates a signal flow diagram of a communication method 100 for setting up a call between a caller device and one or more target devices. The communication method 100 utilizes an Asynchronous Frequency Hopping System for communication between a caller device 105 and one or more target devices 110. In the system 100 a caller device 105 initiates the call by transmitting three preamble signals (115, 120, and 130) over three unique frequencies and three synchronization signals (140, 150 and 160) over another three unique frequencies. On receiving the acknowledgement signal 165, the caller device 105 transmits identification signals 170 over a plurality of frequencies, including a private identification (Private ID) of the caller device 105 to establish the call, and thereafter the caller device 105 begins transmitting data frames 180. Further when the caller device 105 completes data transmission, the established call is terminated on transmitting a call termination signal 190 over a plurality of frequencies. The unique frequencies are fixed frequencies selected from a plurality of frequencies for use in the Asynchronous Frequency Hopping System, where the plurality of frequencies are used for communication of information between the caller device 105 and the target device 110.

Figure 2:
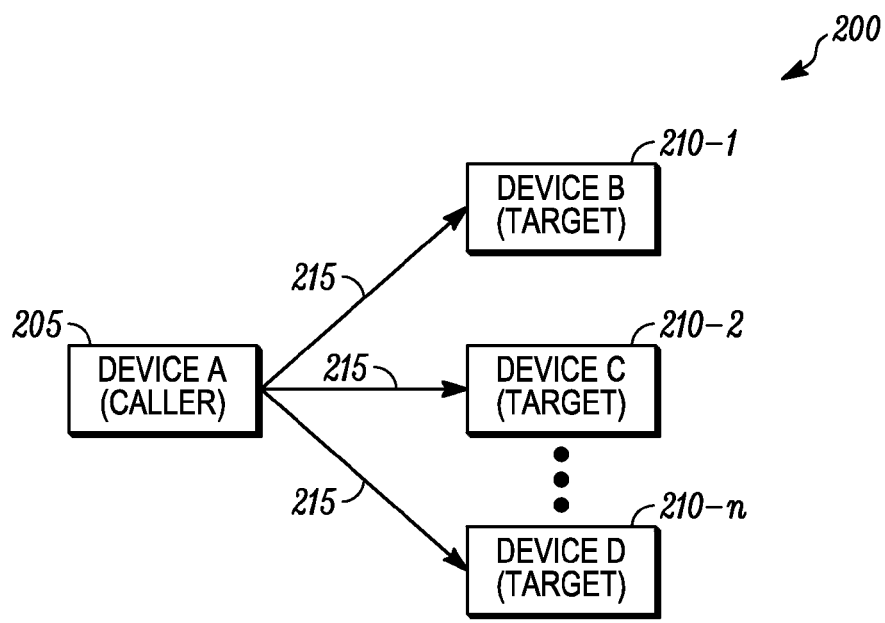
FIG. 2 is a block diagram illustrating a communication system employing a caller device and one or more target devices for establishing a data communication link in accordance with some embodiments.

FIG. 2 is a block diagram illustrating, a communication system 200 employing a caller device 205 and one or more target devices 210-n for establishing a data communication link 215, in accordance with some embodiments. The communication system 200 comprises a plurality of communication devices that are capable of wirelessly communicating with each other with or without the support of any network infrastructure equipments. The communication system 200 can be a two-way communication network, such as a network of walkie-talkie devices, a push-to-talk system, a peer to peer communication network, and the like. Further, the caller device 205 and the one or more target devices 210-n can be any communication device, such as two-way radios, walkie-talkie devices, mobile telephones, and the like.

The communication system 200 applies an Asynchronous Frequency Hopping method for enabling communication between the caller device 205 and the one or more target devices 210-n. In the communication system 200, the caller device 205 initiates a call with the one or more target devices 210-n by transmitting control information such as a preamble signal and a synchronization signal over unique fixed frequencies, for example f1 and f2. These unique fixed frequencies used in the Asynchronous Frequency Hopping system are selected from a frequency hopset and are known to both the caller device 205 and the one or more target devices 210-n. Further, the caller device 205 waits for a predetermined amount of time to receive an acknowledgment signal from the one or more target devices 210-n. On receiving an acknowledgement signal, the caller device 205 establishes the data communication link 215. In accordance with some embodiments, the caller device 205 establishes the data communication link 215 as soon as the caller device 205 receives at least one acknowledgement signal from the one or more target devices 110-n. Therefore, in such embodiments, the system 200 establishes the data communication link 215 much faster than the conventional system 100. Further, the data communication link 215 can comprise a group call with a plurality of target devices 210-n or a private call with one target device 210-1.

Figure 3:
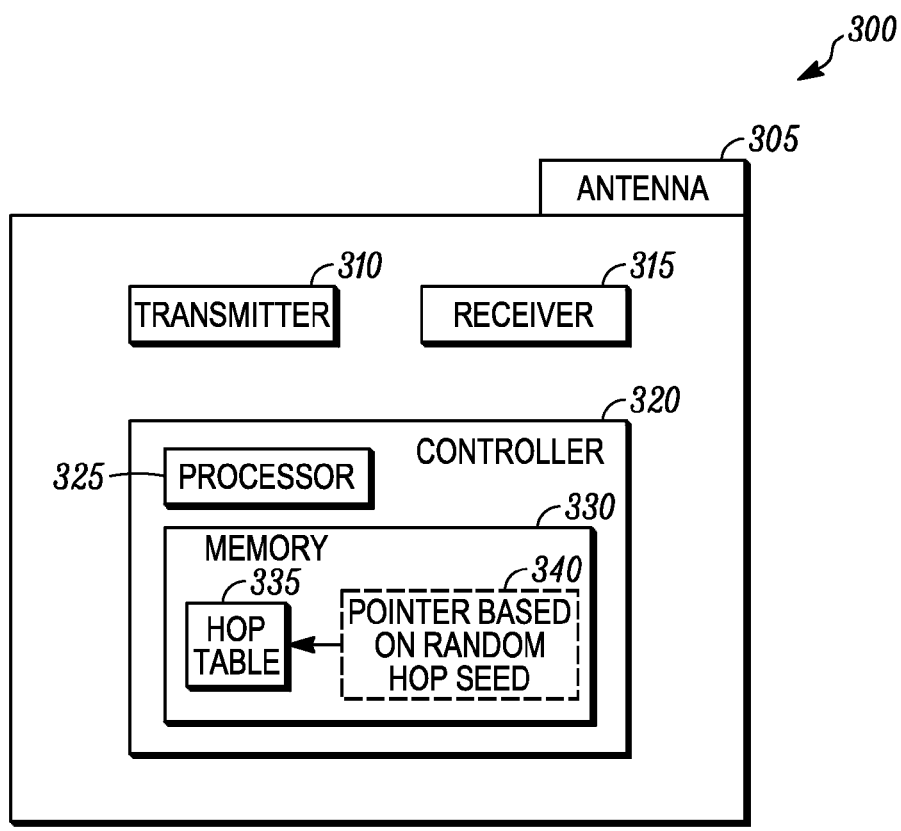
FIG. 3 is a block diagram illustrating further detail of a communication device employed in the communication system as shown in FIG. 2 in accordance with some embodiments.

FIG. 3 is a block diagram illustrating further detail of a communication device 300 employed in the communication system 200 as shown in FIG. 2, in accordance with some embodiments. The device 300 can be implemented as a caller device 205 and/or the one or more target devices 210-n. The communication device 300 comprises an antenna 305, a transmitter 310, a receiver 315, and a controller 320. The transmitter 310 is configured to transmit at least one preamble signal and at least one synchronization signal over a plurality of fixed unique frequencies selected from the frequency hopset; and at least one acknowledgement signal, at least one identification signal, at least one data frame, and at least one call termination signal over at least one frequency randomly selected from the frequency hopset. The receiver 315 is configured to receive at least one preamble signal and at least one synchronization signal over the unique fixed frequencies of a plurality of frequencies; and at least one acknowledgement signal, at least one identification signal, at least one data frame, and at least one call termination signal over at least one frequency randomly selected from the frequency hopset.

Further, the controller 320 comprises a processor 325 and a memory 330. The processor 325 is configured to the control the transmitter 310 and the receiver 315. The processor 325 includes one or more microprocessors, microcontrollers, DSPs (digital signal processors), state machines, logic circuitry, or any other device or devices that process information based on operational or programming instructions. Such operational or programming instructions are stored in the memory 330.

Further, the memory 330 comprises information related to a hop table 335 and a pointer 340 based on a random hop seed. As used herein, the hop table 335 includes a list of a plurality of frequencies (also referred to as frequency hopset) for enabling synchronized communication between the caller device 205 and the one or more target devices 210-n. In one example, the hop table 335 comprises a set of fifty frequencies for use in the transmission and the reception of information. Further, the hop seed is a random number generated by the caller device 205 and is communicated to the one or more target devices 210-n during the initial connection establishment phase, within the synchronization slots. This hop seed used to generate a pseudorandom hopping sequence for enabling synchronization of communication between the caller device 205 and the one or more target devices 210-n. The hop seeds used by the uplink and the downlink are different, and they are also updated after each call.

Further, the memory 330 can be an integrated circuit (IC) memory chip containing any form of random-access memory (RAM) or read-only memory (ROM), a floppy disk, a compact disk read-only memory (CD-ROM), a hard disk drive, a digital video disc (DVD), a flash memory card, external subscriber identity module (SIM) card or any other medium for storing digital information.

Figure 4:
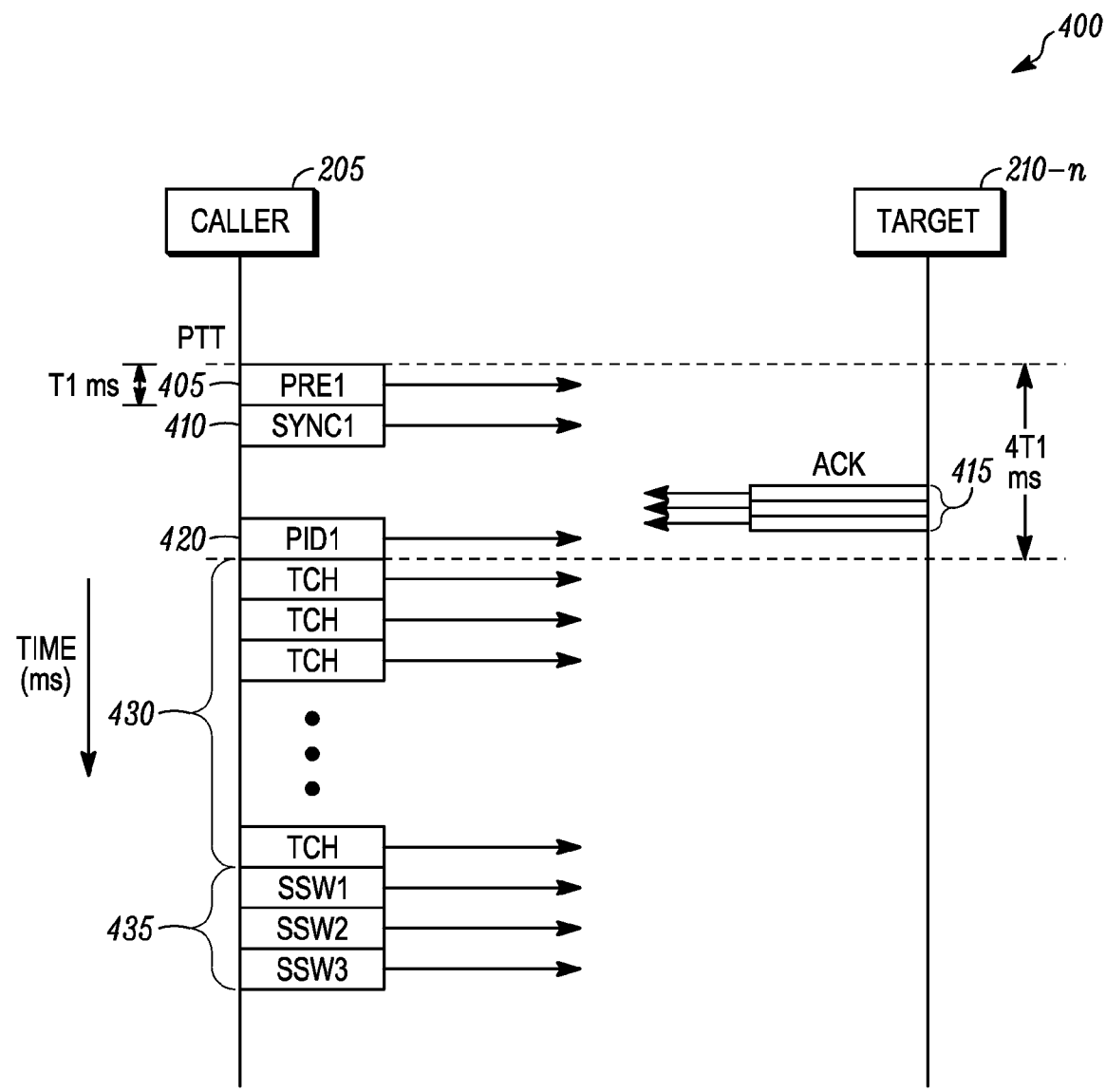
FIG. 4 is a signal flow diagram illustrating an exchange of signals between a caller device and one or more target devices for establishing a data communication link in accordance with some embodiments.

FIG. 4 is a signal flow diagram 400 illustrating an exchange of signals between a caller device 205 and one or more target devices 210-n for establishing a data communication link 215, in accordance with some embodiments. FIG. 4 illustrates the caller device 205 transmitting a preamble slot and a synchronization slot in adjacent time slots. Further, the preamble slot (PRE1) 405 is transmitted over a first unique fixed frequency (f1) selected from a frequency hopset and the synchronization slot (SYNC1) 410 is transmitted over a second unique fixed frequency (f2) selected from the frequency hopset.

As used herein, the "preamble slot" wakes up the one or more target devices 210-n and provides information for initializing the data communication link 215 and a coarse time synchronization to the one or more target devices 210-n. Following the preamble slot, the "synchronization slot" provides information related to an exact time and frequency hopping synchronization to the one or more target devices 210-n. In embodiments where the communication system 200 is implemented as a cellular communication system, a forward channel, such as a control channel provides a constant reference for synchronization between the caller device 205 and the one or more target devices 210-n. However in embodiments using mobile-to-mobile communication, synchronization can be challenging since there is no channel to lock onto and track to obtain the constant reference. As such, a reference needs to be established for synchronizing communication between the caller device 205 and the one or more target devices 210-n. This reference can be established by the caller device 205 using the preamble and synchronization slots at the beginning of each call setup. The one or more target devices 210-n can decode these preamble and synchronization slots, and acquire frequency, symbol timing, and frame synchronization, before communication of actual traffic data.

Further, FIG. 4 illustrates the caller device 205 waiting for a predetermined amount of time (T1 milliseconds (ms)) to receive an acknowledgment signal from the one or more target devices 210-n. During the predetermined amount of time, the one or more target devices 210-n on receiving the PRE1 405 over the frequency f1 and the SYNC1 410 over the frequency f2 transmits the acknowledgement signal (ACK) 415 over a plurality of frequencies selected from the frequency hopset. As used herein, "acknowledgement signal" is initiated by the one or more target devices 210-n to indicate acknowledgment of the "preamble slot" and the "synchronization slot". The "acknowledgement signal" needs to be received by the caller device 205 before establishing the data communication link 215. continuing the call beyond the PRE and SYNC. Further in some embodiments, the one or more target devices 210-n sends the ACK 415 on three random frequencies selected from the frequency hopset, according to the frequency hopping pattern determined from the hop seed. Thereafter the caller device 205 establishes the data communication link 215 between the caller device 205 and the one or more target devices 210-n over random frequencies selected from the frequency hopset. The caller device 205 establishes the data communication link 215 by transmitting an identification signal 420 (shown as PID1) over a random frequency selected from the frequency hopset. As used herein, the "identification signal" comprises the private ID of the caller device 205. In accordance with some embodiments, the random frequency over which the identification signal is transmitted is based on the frequency hopping pattern. Next, the caller device 205 begins communication of data, for example using traffic channel frames (TCH) 430, to the one or more target devices 210-n. On completing the communication of data, the caller device 205 transmits a super stop waveform (SSW-n) 435 to terminate the data communication link 215. As used herein, the SSW-n comprises a unique pattern of symbols that are known a priori to both the caller device 205 and the one or more target devices 210-n. The presence of this unique pattern among the traffic data indicates the termination of the data communication link 215 to the one or more target devices 210-n.

Further, the first and the second unique fixed frequencies belong to a set of six fixed frequencies (f1, f2, f3, f4, f5, and f6) selected from the frequency hopset. The set of fixed frequencies enable transmission of control information for example, PRE1 405 and SYNC1 410. In accordance with an embodiment the one or more target devices 210-n can monitor the unique fixed frequencies to receive PRE1 405 and SYNC1 410.

According to some embodiments, the predetermined amount of time (T1 ms) is equal to a blank time slot, wherein a time duration of the time slot is 90 milliseconds. Furthermore, a duration of each of the PRE1 405, SYNC1 410, and PID1 420 is also equal to the duration of the time slot. As such, in such embodiments the connection establishment time, i.e. the time duration from the beginning of transmission of the PRE1 405 over the frequency f1 to the end of the transmission of the identification signal PID1 420 over the random frequency is that of four time slots width or 360 milliseconds.

Figure 5:
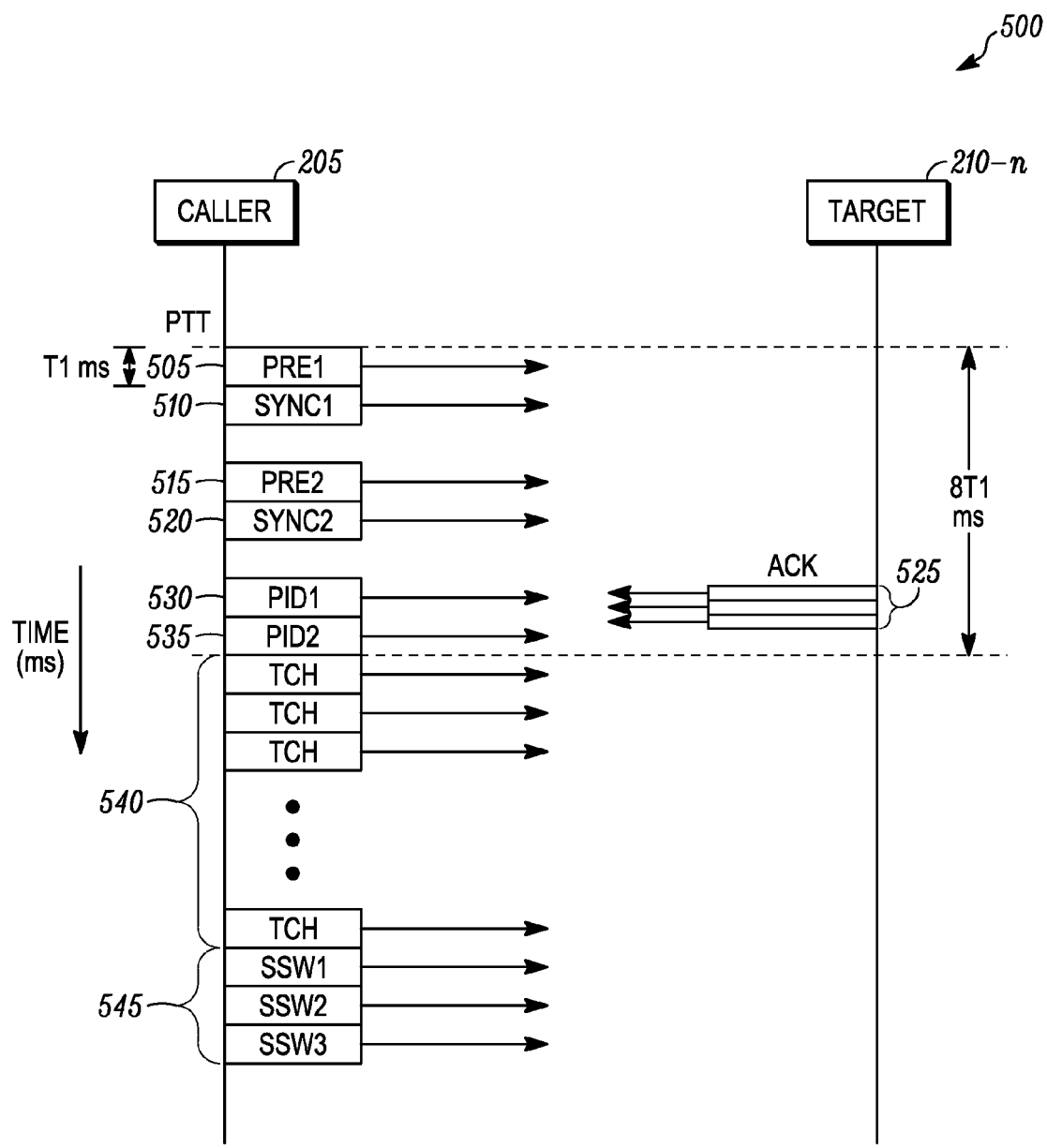
FIG. 5 is a signal flow diagram illustrating an exchange of signals between a caller device and one or more target devices for establishing a data communication link in accordance with some embodiments.

FIG. 5 is a signal flow diagram 500 illustrating an exchange of signals between a caller device 205 and one or more target devices 210-n for establishing a data communication link 215 in accordance with some embodiments. FIG. 5 illustrates the caller device 205 transmitting a preamble slot (PRE1) 505 and a synchronization slot (SYNC1) 510 in adjacent time slots, wherein the PRE1 505 is transmitted over a first unique fixed frequency (f1) and the SYNC1 510 is transmitted over a second unique fixed frequency (f2.) The caller device 205 then waits for a predetermined amount of time (T1 ms) to determine whether an acknowledgment signal from the one or more target devices 210-n is received in response to transmitting the PRE1 505 over the frequency f1 and the SYNC1 510 over the frequency f2. When the caller device 205 determines that the acknowledgement signal is not received, the caller device 205 transmits, in adjacent time slots, a preamble slot (PRE2) 515 over a third unique fixed frequency (f3) and a synchronization slot (SYNC2) 520 over a fourth unique fixed frequency (f4), both the frequencies f3 and f4 selected from the frequency hopset.

Further, FIG. 5 illustrates the caller device 205 waiting for a predetermined amount of time (T1 ms) to receive an acknowledgment signal from the one or more target devices 210-n in response to transmitting the PRE2 515 over the frequency f3 and the SYNC2 520 over the frequency f4. During the predetermined amount of time, the one or more target devices 210-n transmits the acknowledgement signal (ACK) 525 in response to receiving the PRE2 515 over the frequency f3 and the SYNC2 520 over the frequency f4. Further, in some embodiments, the one or more target devices 210-n sends the ACK 525 on three frequencies randomly selected from the frequency hopset, according to the frequency hopping pattern. Thereafter, upon receiving the ACK 525 from the one or more target devices 210-n in response to transmitting the PRE2 515 over the frequency f3 and the SYNC2 520 over the frequency f4, the caller device 205 establishes the data communication link 215 between the caller device 205 and the one or more target devices 210-n over a random sequence of frequencies selected from the frequency hopset. The caller device 205 establishes the data communication link 215 by transmitting identification signals 530 and 535 (shown as PID1 and PID2) over two random frequencies. In accordance with some embodiments, these two random frequencies are randomly selected from the frequency hopset according to the frequency hopping pattern. Next, the caller device 205 begins communication of data, for example using traffic channel frames (TCH) 540, to the one or more target devices 210-n. On completing the communication of data, the caller device 205 transmits a call termination signal (SSW-n) 545 to terminate the data communication link 215.

Further, the first, second, third, and fourth unique fixed frequencies belong to a set of six fixed frequencies (f1, f2, f3, f4, f5, and f6) selected from the frequency hopset. The set of fixed frequencies enable transmission of control information for example, PRE1 505, PRE2 515, SYNC1 510, and SYNC2 520. Further, in accordance with some embodiments, the one or more target devices 210-n can monitor the unique fixed frequencies to receive PRE1 505, PRE2 515, SYNC1 510, and SYNC2 520.

Further, according to some embodiments the predetermined amount of time (T1 ms) is equal to a blank time slot, wherein a time duration of the time slot is 90 milliseconds. Further, a duration of each of the PRE1 505, PRE2 515, SYNC1 510, SYNC1 520, PID1 530, and PID2 535 is also equal to the duration of the time slot. As such, in such embodiments the connection establishment time, i.e. the time duration from the beginning of transmission of the PRE1 505 over the frequency f1 to the end of the transmission of the identification signals (PID1 530 and PID2 535) over the two random frequencies is that of eight time slots or 720 milliseconds.

Figure 6:
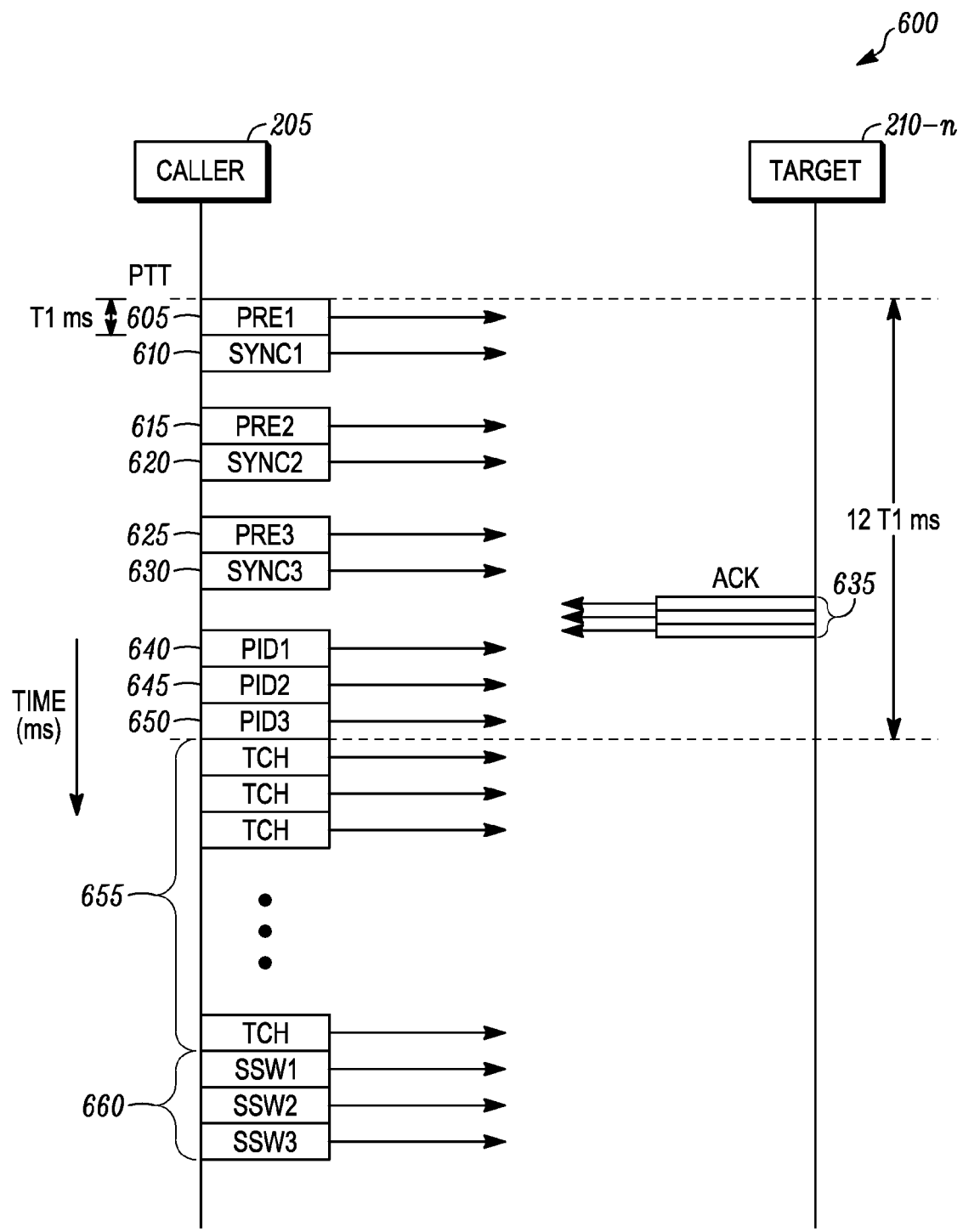
FIG. 6 is a signal flow diagram illustrating an exchange of signals between a caller device and one or more target devices for establishing a data communication link in accordance with some embodiments.

FIG. 6 is a signal flow diagram 600 illustrating an exchange of signals between a caller device 205 and one or more target devices 210-n for establishing a data communication link 215 in accordance with some embodiments. The figure illustrates the caller device 205 transmitting a preamble slot and a synchronization slot in adjacent time slots, wherein the preamble slot (PRE1) 605 is transmitted over a first unique fixed frequency (f1) and the synchronization slot (SYNC1) 610 is transmitted over a second unique fixed frequency (f2). The caller device 205 then waits for a predetermined amount of time (T1 ms) to determine whether an acknowledgment signal from the one or more target devices 210-n is received in response to transmitting the PRE1 605 over the frequency f1 and the SYNC1 610 over the frequency f2. When the caller device 205 determines that the acknowledgement signal is not received, the caller device 205 transmits, in adjacent time slots, a preamble slot (PRE2) 615 over a third unique fixed frequency (f3) and a synchronization slot (SYNC2) 620 over a fourth unique fixed frequency (f4).

Further, FIG. 6 illustrates the caller device 205 waiting for the predetermined amount of time (T1 ms) to determine whether an acknowledgment signal is received from the one or more target devices 210-n, in response to transmitting the PRE2 615 over the frequency f3 and the SYNC2 620 over the frequency f4. When the caller device 205 determines that the acknowledgement signal is not received, the caller device 205 transmits, in adjacent time slots, a preamble slot (PRE3) 625 over a fifth unique fixed frequency (f5) and a synchronization slot (SYNC3) 630 over a sixth unique fixed frequency (f6), both frequency f5 and frequency f6 selected from the frequency hopset.

Further, FIG. 6 illustrates the caller device 205 waiting for the predetermined amount of time (T1 ms) to determine whether an acknowledgment signal from the one or more target devices 210-*n* is received, in response to transmitting the PRE3 625 over the frequency f5 and the SYNC3 630 over the frequency f6. During the predetermined amount of time, the one or more target devices 210-*n* transmits the acknowledgement signal (ACK) 635 in response to receiving the PRE3 625 over the frequency f5 and the SYNC3 630 over the frequency f6. Further in some embodiments, the one or more target devices 210-*n* sends the ACK 635 over three random frequencies selected randomly from the frequency hopset, according to the frequency hopping pattern. Thereafter, upon receiving the ACK 635 from the one or more target devices 210-*n* in response to transmitting the PRE3 625 over the frequency f5 and the SYNC3 630 the frequency f6, the caller device 205 establishes the data communication link 215 between the caller device 205 and the one or more target devices 210-*n* over a random sequence of frequencies selected from the frequency hopset. The caller device 205 establishes the data communication link 215 by transmitting identification signals 640, 645, and 650 (shown as PID1, PID2, and PID3) over three frequencies. The identification signals 640, 645, and 650 comprise a private ID of the caller device 205. In accordance with some embodiments, the three random frequencies are randomly selected from the frequency hopset, according to the frequency hopping pattern. Next, the caller device 205 begins communication of data, for example using traffic channel frames (TCH) 655, to the one or more target devices 210-*n*. On completing the communication of data, the caller device 205 transmits a call termination signal 660 (SSW-n) to terminate the data communication link 215.

Further, the first, second, third, fourth, fifth, and sixth unique fixed frequencies belong to a set of six fixed frequencies (f1, f2, f3, f4, f5, and f6) selected from the frequency hopset. The set of fixed frequencies enable transmission of control information for example, PRE1 605, PRE2 615, PRE3 625, SYNC1 610, SYNC2 620, and SYNC3 630. Further, in accordance with some embodiments the one or more target devices 210-*n* monitor the unique fixed frequencies to receive PRE1 605, PRE2 615, PRE3 625, SYNC1 610, SYNC2 620, and SYNC3 630.

Further, according to some embodiments the predetermined amount of time (T1 ms) is equal to a blank time slot, wherein a time duration of the time slot is 90 milliseconds. Further, a duration of each of the PRE1 605, PRE2 615, PRE3 625, SYNC1 610, SYNC2 620, SYNC3 630, PID1 640, PID2 645, and PID3 650 is also equal to the duration of the time slot. As such, in such embodiments the connection establishment time, i.e. the time duration from the beginning of transmission of the PRE1 605 over the frequency f1 to the end of the transmission of the identification signals (PID1 640, PID2 645, and PID3 650) over the three random frequencies is that of twelve time slots or 1080 milliseconds.

Figure 7:
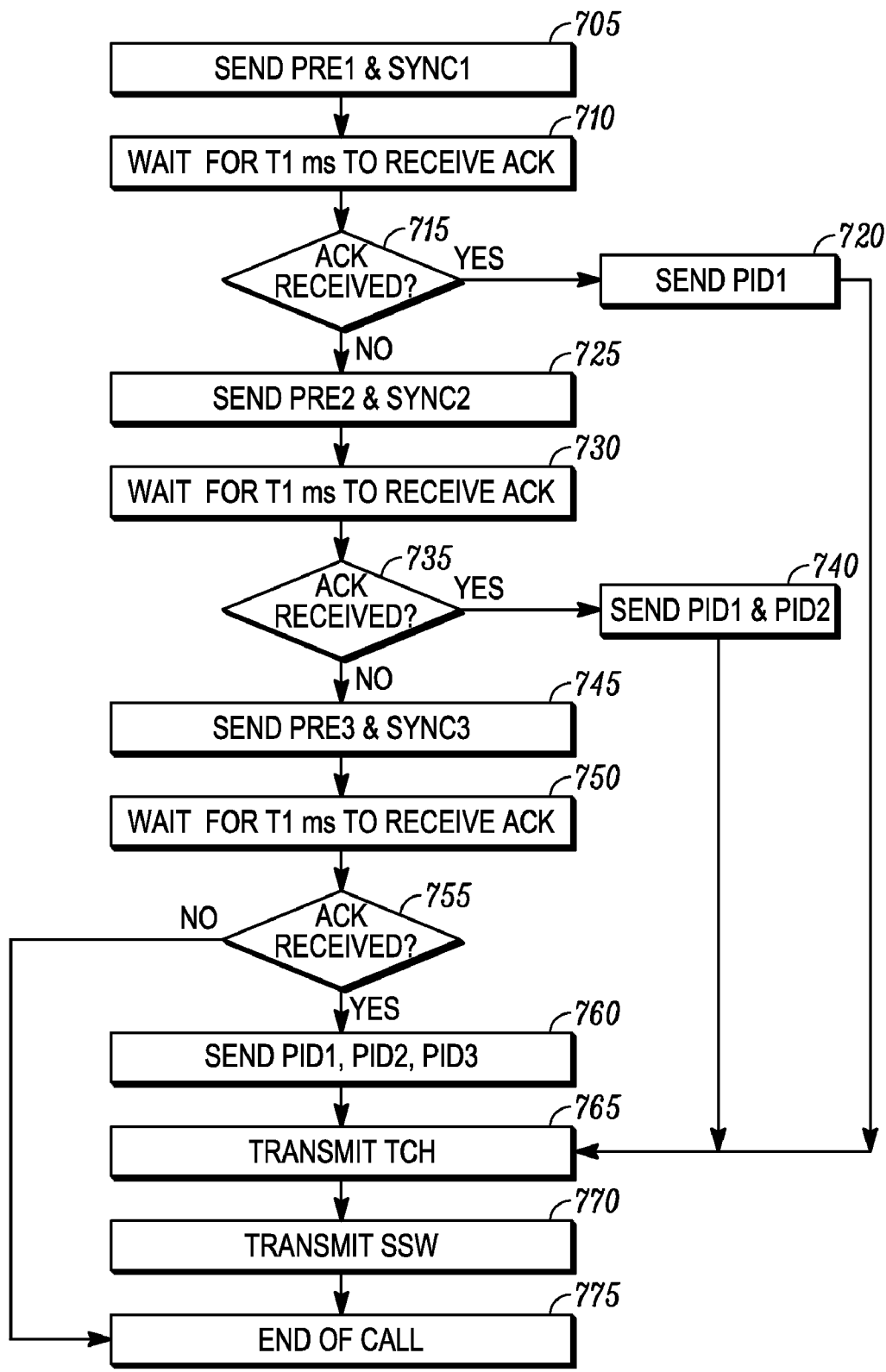
FIG. 7 is a flowchart illustrating a method of operation of a caller device for establishing a data communication link with one or more target devices in accordance with some embodiments.

FIG. 7 is a flowchart illustrating a method 700 of operation of a caller device 205 for establishing a data communication link 215 with one or more target devices 210-*n*, in accordance with some embodiments. The caller device 205 initiates a call to establish a data communication link 215 with one or more target devices 210-*n*. At block 705, the caller device 205 transmits a preamble slot and a synchronization slot in adjacent time slots. The preamble slot is transmitted over a first unique fixed frequency (f1) and the synchronization slot is transmitted over a second unique fixed frequency (f2). At block 710, the caller device 205 waits for a predetermined amount of time (T1 ms) to receive an acknowledgment signal from the one or more target devices 210-*n* in response to transmitting the preamble slot over the frequency f1 and the synchronization slot over the frequency f2. At block 715, the caller device 205 determines whether an acknowledgement signal is received in response to transmitting the preamble slot over the frequency f1 and the synchronization slot over the frequency f2. When at block 715 the caller device 205 determines that an acknowledgement signal is received, then at block 720 the caller device 205 establishes a data communication link 215 by transmitting an identification signal over a frequency randomly selected from the frequency hopset, according to the frequency hopping pattern. The identification signal comprises a private ID of the caller device 205. Next at block 765, the caller device 205 begins communication of data, for example using traffic channel frames (TCH) over a plurality of frequencies randomly selected from the frequency hopset, according to the frequency hopping pattern. On completing the communication of data, at block 770 the caller device 205 transmits a call termination signal (SSW-n) to terminate the data communication link 215. At block 775, the data communication link 215 is terminated.

Returning to block 715, when the caller device 205 determines that an acknowledgement signal is not received, then at block 725 the caller device 205 transmits, in adjacent time slots, a preamble slot over a third unique fixed frequency (f3) and a synchronization slot over a fourth unique fixed frequency (f4), both the frequency f3 and the frequency f4 selected from the frequency hopset. Next at block 730, the caller device 205 waits for the predetermined amount of time (T1 ms) to receive an acknowledgment signal from the one or more target devices 210-*n* in response to transmitting the preamble slot over the third unique fixed frequency and the synchronization slot over the fourth unique fixed frequency. At block 735, the caller device 205 determines whether an acknowledgement signal is received in response to transmitting the preamble slot over the frequency f3 and the synchronization slot over the frequency f4. When at block 735 the caller device 205 determines that an acknowledgement signal is received, then at block 740 the caller device 205 establishes a data communication link 215 by transmitting an identification signal over two frequencies randomly selected from the frequency hopset, according to the frequency hopping pattern. The identification signal comprises a private ID of the caller device 205. Next at block 765, the caller device 205 begins communication of data, for example using TCH frames, over a plurality of frequencies randomly selected from the frequency hopset, according to the frequency hopping pattern. On completing the communication of data, at block 770 the caller device 205 transmits a call termination signal (SSW-n) to terminate the data communication link 215. At block 775, the data communication link 215 is terminated.

Returning to block 735, when the caller device 205 determines that an acknowledgement signal is not received, then at block 845 the caller device 205 transmits, in adjacent time slots, a preamble slot over a fifth unique fixed frequency (f5) and a synchronization slot over a sixth unique fixed frequency (f6), both the frequency f5 and the frequency f6 selected from the frequency hopset. At block 750, the caller device 205 waits for the predetermined amount of time (T1 ms) to receive an acknowledgment signal from the one or more target devices 210-n in response to transmitting the preamble slot over the frequency f5 and the synchronization slot over the frequency f6. At block 755, the caller device 205 determines whether an acknowledgement signal is received in response to transmitting the preamble slot over the frequency f6 and the synchronization slot over the frequency f6. When at block 755 the caller device 205 determines that an acknowledgement signal is received, then at block 760 the caller device 205 establishes a data communication link 215 by transmitting an identification signal over three frequencies randomly selected from the frequency hopset, according to the frequency hopping pattern. The identification signal comprises the private ID of the caller device 205. Next at block 765, the caller device 205 begins communication of data, for example using TCH frames, over a plurality of frequencies randomly selected from the frequency hopset, according to the frequency hopping pattern. On completing the communication of data, at block 770 the caller device 205 transmits a call termination signal (SSW-n) to terminate the data communication link 215. At block 775, the data communication link 215 is terminated.

Returning to block 755, when the caller device 205 determines that an acknowledgement signal is not received; then at block 875, the data communication link 215 is terminated.

The embodiments described above provides a fast call setup in an Asynchronous Frequency Hopping system, where according to some embodiments a data communication link 215 can be established in four time slot widths. As such, this results in the caller device 205 skipping transmission of the preamble slot and the synchronization slot over at least one unique fixed frequency, on receiving the acknowledgement signal from the one or more target devices 210-n, and thereby reducing time delay incurred in the establishment of the data communication link 215. Also, in accordance to another embodiment, the system 100 applies a Configurable Range Extension feature. The Configurable Range Extension enables the caller device 205 to transmit the preamble slots on all three unique fixed frequencies (f1, f3, and f5) and the synchronization slots on all three unique fixed frequencies (f2, f4, and f6) in order to extend the range of communication of the caller device 205. So, when a caller device 205 determines a need for establishing a data communication link with maximum number of target devices 210-n, the caller device 205 continues to transmit the preamble slot over the frequencies f1, f3, and f5 and the synchronization slot over the frequencies f2, f4, and f6, irrespective of whether an acknowledgement signal is received or not. Further, the one or more target devices 210-n transmit at least one acknowledgement signal in response to receiving at least one preamble signal and at least one synchronization signal. As such, this feature ensures a greater range and maximum number of target devices 210-n communicating with the caller device 205.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for call setup in an asynchronous frequency hopping digital two-way communication system, the method comprising:

transmitting in immediately adjacent time slots, by a caller device to one or more target devices, a first pair of slots including (i) a first preamble slot, in a set of one or more preamble slots, over a first unique fixed frequency selected from a frequency hopset and (ii) a first synchronization slot, in a set of one or more synchronization slots, over a second unique fixed frequency selected from the frequency hopset in adjacent time slots;

waiting, by the caller device, a predetermined amount of time to receive an acknowledgement signal from the one or more target devices in response to transmitting the first preamble slot and the first synchronization slot;

transmitting in immediately adjacent time slots, by the caller device to the one or more target devices, a second pair of slots including (i) a second preamble slot in the set of one or more preamble slots over a third unique fixed frequency selected from the frequency hopset and (ii) a second synchronization slot in the set of one or more synchronization slots over a fourth unique fixed frequency selected from the frequency hopset;

waiting, by the caller device, the predetermined amount of time to receive second acknowledgement signal from the one or more target devices in response to transmitting the second preamble slot and the second synchronization slot;

transmitting, by the caller device to the one or more target devices, a third pair of slots including (i) a third preamble slot in the set of one or more preamble slots over a fifth unique fixed frequency selected from the frequency hopset and (ii) a third synchronization slot in the set of one or more synchronization slots over a sixth unique fixed frequency selected from the frequency hopset in immediately adjacent time slots;

waiting, by the caller device, the predetermined amount of time to receive a third acknowledgement signal from the one or more target devices in response to transmitting the third preamble slot and the third synchronization slot;

establishing, by the caller device, the data communication link between the caller device and the one or more target devices over at least one random frequency selected from the frequency hopset, in response to receiving at least one of the first, second, and third acknowledgement signals from the one or more target devices.

2. A method for call setup in an asynchronous frequency hopping digital two-way communication system, the method comprising:

transmitting in immediately adjacent time slots, by a caller device, a first pair of slots including (i) a first preamble slot, in a set of one or more preamble slots, over a first unique fixed frequency and (ii) a first synchronization slot, in a set of one or more synchronization slots, over a second unique fixed frequency to one or more target devices;

if an acknowledgement signal is received at the caller device from the one or more target devices, establishing, by the caller device, the data communication link between the caller device and the one or more target devices over at least one random frequency selected from a frequency hopset responsive to receiving the acknowledgement signal from the one or more target devices; and if the acknowledgment signal is not received at the caller device from the one or more target devices, responsively transmitting in immediately adjacent time slots, by the caller device, a second pair of slots including (i) a second preamble slot, in the set of one or more preamble slots, over a third unique fixed frequency and (ii) a second synchronization slot, in the set of one or more synchronization slots, over a fourth unique fixed frequency to the one or more target devices.

3. The method as claimed in claim 2, wherein the acknowledgment signal is received and establishing the data communication link comprises:

transmitting, by the caller device, one identification signal over one random frequency selected from the frequency hopset to the one or more target devices to establish the data communication link.

4. The method as claimed in claim 2, wherein the acknowledgment signal is not received, the method further comprising:

if a second acknowledgement signal is received at the caller device from the one or more target devices, establishing, by the caller device, the data communication link between the caller device and the one or more target devices over at least one random frequency selected from the frequency hopset, responsive to receiving the second acknowledgement signal from the one or more target devices; and if the second acknowledgment signal is not received at the caller device from the one or more target devices, responsively transmitting in immediately adjacent time slots, by the caller device, a third pair of slots including (i) a third preamble slot, in the set of one or more preamble slots, over a fifth unique fixed frequency and (ii) a second synchronization slot, in the set of one or more synchronization slots, over a sixth unique fixed frequency to the one or more target devices.

5. The method as claimed in claim 4, wherein the second acknowledgment signal is received and establishing the data communication link comprises:

transmitting by the caller device an identification signal over two random frequencies selected from the frequency hopset to the one or more target devices to establish the data communication link.

6. The method as claimed in claim 5, wherein the second acknowledgment signal is not received, the method further comprising:

if a third acknowledgment signal is received at the caller device from the one or more target devices, establishing, by the caller device, the data communication link between the caller device and the one or more target devices over at least one random frequency selected from the frequency hopset responsive to receiving the third acknowledgement signal from the one or more target devices.

7. The method as claimed in claim 6, wherein establishing the data communication link comprises:

transmitting by the caller device an identification signal over three random frequencies selected from the frequency hopset to the one or more target devices to establish the data communication link.

8. The method as claimed in claim 2, wherein the acknowledgement signal is transmitted over three frequencies randomly selected from the frequency hopset.

9. The method as claimed in claim 2, wherein a duration of the time slot is substantially 90 milliseconds.

10. The method as claimed in claim 3, wherein a time duration from a beginning of the transmitting the first preamble slot over the first frequency and the first synchronization slot over the second frequency to an end of the transmitting of the one identification signal over the one random frequency selected from the frequency hopset is substantially 360 milliseconds.

11. The method as claimed in claim 2, wherein the one or more target devices is in direct range of the caller device.

12. The method as claimed in claim 2, further comprising skipping transmission of a subsequent preamble slot in the set of one or more preamble slots and a subsequent synchronization slot in the set of one or more synchronization slots by the caller device, responsive to receiving the acknowledgement signal.

13. The method as claimed in claim 2, wherein each preamble slot in the set of one or more preamble slots comprises information for initializing a data communication link and providing coarse time synchronization information to the one or more target devices, and each synchronization slot in the set of one or more synchronization slots comprises information related to exact time and frequency for synchronization between the caller device and one or more target devices.

14. A caller device for call setup in an asynchronous frequency hopping digital two-way communication system, the device comprising:
a transmitter configured to transmit, in immediately adjacent time slots, a first pair of slots including (i) a first preamble slot, in a set of one or more preamble slots, over a first unique fixed frequency selected from a frequency hopset and (ii) a first synchronization slot, in a set of one or more synchronization slots, over a second unique fixed frequency of selected from the frequency hopset to one or more target devices; and
a processor configured to:
determine whether an acknowledgement signal is received from the one or more target devices during a predetermined amount of time after the transmission of the first preamble slot and the first synchronization slot;
if the acknowledgement signal is received, control the transmitter to establish the data communication link between the caller device and the one or more target devices over at least one random frequency selected from a frequency hopset responsive to receiving the acknowledgement signal from the one or more target devices; and
if the acknowledgment signal is not received, responsively control the transmitter to transmit in immediately adjacent time slots a second pair of slots including (i) a second preamble slot, in the set of one or more preamble slots, over a third unique fixed frequency and (ii) a second synchronization slot, in the set of one or more synchronization slots, over a fourth unique fixed frequency to the one or more target devices.

15. The device as claimed in claim 14, wherein the acknowledgment signal is not received, and:
the processor is further configured to control the transmitter to establish a communication link with the one or more target devices over at least one random frequency selected from the frequency hopset, responsive to determining that a second acknowledgement signal is received in response to transmitting the second preamble slot and the second synchronization slot; and
the processor is further configured to control the transmitter to transmit, in immediately adjacent time slots, a third pair of slots including (i) a third preamble slot, in the set of one or more preamble slots, over a fifth unique fixed frequency selected from the frequency hopset and (ii) a third synchronization slot, in the set of one or more synchronization slots, over a sixth unique fixed frequency selected from the frequency hopset, when the second acknowledgement signal is not received in response to transmitting the second preamble slot and the second synchronization slot.

16. The device as claimed in claim 15, wherein:
the processor is further configured to determine whether a third acknowledgement signal from the one or more target devices is received during the predetermined amount of time after the transmission of the third preamble slot and the third synchronization slot; and
the processor is further configured to establish a communication link with the one or more target devices over at least one random frequency selected from the frequency hopset, when the third acknowledgement signal is received in response to transmitting the third preamble slot and the third synchronization slot.

17. The device as claimed in claim 16, wherein the predetermined amount of time is substantially 90 milliseconds.

18. The device as claimed in claim 14, wherein the one or more target devices are in direct range of the caller device.

19. The device as claimed in claim 14, wherein each of the preamble slots in the set of one or more preamble slots comprises information for initializing the data communication link and providing a coarse time synchronization information to the one or more target devices, and each of the synchronization slots in the set of one or more synchronization slots comprises information pertaining to exact time and frequency for synchronization between the caller device and the one or more target devices.

20. A target device for fast call setup in an asynchronous frequency hopping digital two-way communication system, the device comprising:
a transmitter;
a receiver configured to receive from a caller device, in immediately adjacent time slots, a first pair of slots including (i) a first preamble slot, in a set of one or more preamble slots, over a first unique fixed frequency selected from a frequency hopset and (ii) a first synchronization slot, in a set of one or more synchronization slots, over a second unique fixed frequency selected from the frequency hopset;
a processor configured to control the transmitter to transmit an acknowledgement signal responsive to determining that the first preamble slot and the first synchronization slot are received from the caller device;
the processor configured to control the receiver to communicate with the caller device, in response to the caller device establishing a data communication link with the target device when the caller device receives the acknowledgement signal from the target device;
the receiver configured to receive from a caller device, in immediately adjacent time slots, a second pair of slots including (i) a second preamble slot, in a set of one or more preamble slots, over a third unique fixed frequency selected from a frequency hopset and (ii) a second synchronization slot, in a set of one or more synchronization slots, over a fourth unique fixed frequency selected from the frequency hopset when the caller device does not receive the acknowledgment signal; and
the processor configured to control the transmitter to transmit a second acknowledgement signal responsive to determining that the second preamble slot and the second synchronization slot are received from the caller device.

* * * * *